May 19, 1959  S. BROADBENT  2,887,127
FLUID CONTROL VALVES
Filed May 10, 1954  2 Sheets-Sheet 2

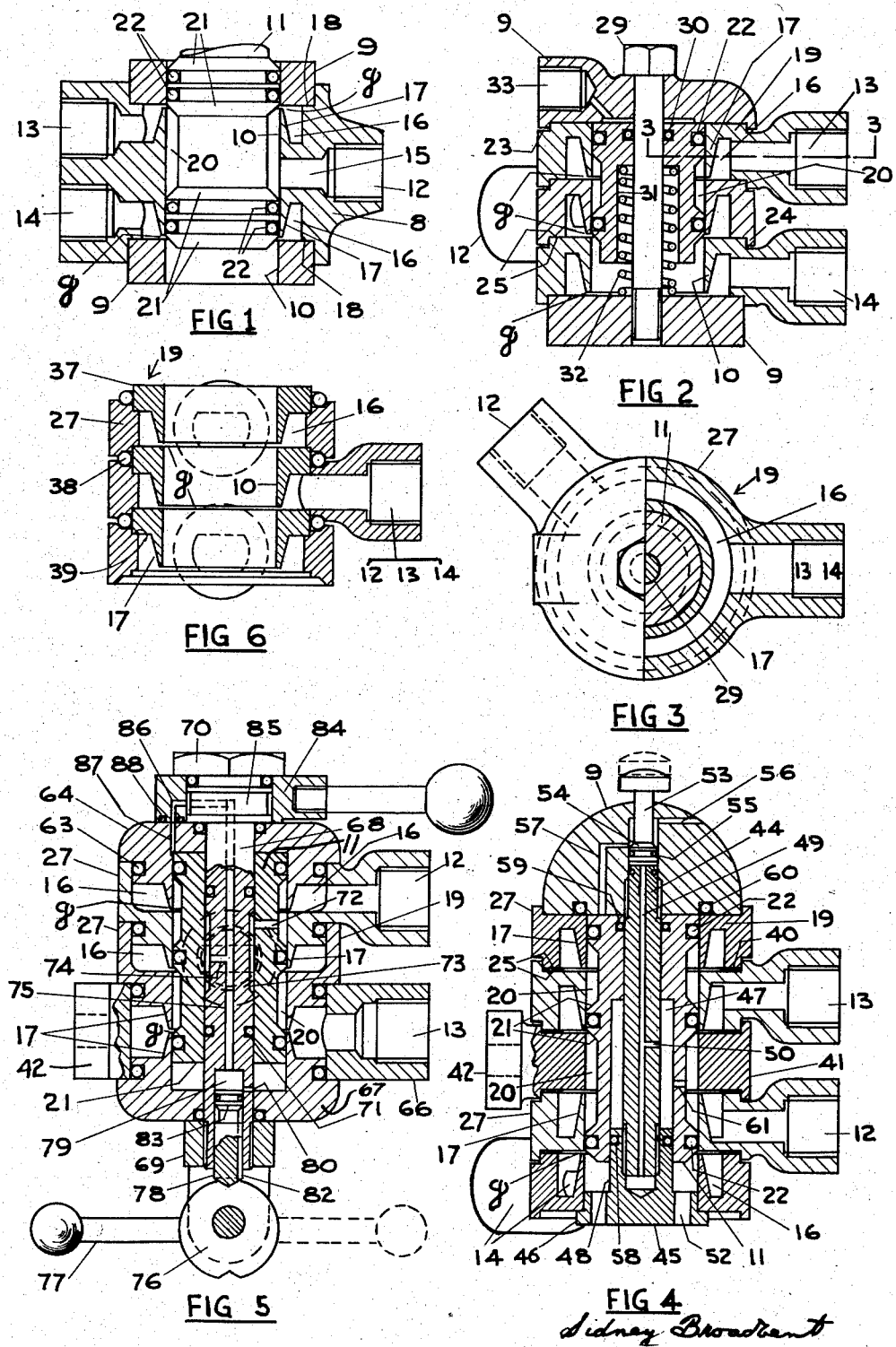

United States Patent Office 2,887,127
Patented May 19, 1959

2,887,127

FLUID CONTROL VALVES

Sidney Broadbent, Montreal, Quebec, Canada

Application May 10, 1954, Serial No. 428,615

Claims priority, application Great Britain August 7, 1953

22 Claims. (Cl. 137—625.29)

The present invention relates to improvements in fluid control valves such as are used for controlling the flow of air or gases or liquids and it is particularly concerned with the design of a valve capable of controlling the flow between a plurality of flow ports, passages, pipeways, exhaust ways or the like, such valve being adapted to be controlled either manually or automatically or for example by the application of fluid pressure.

Such valves as heretofore constructed have commonly included a ported valve body and a controlling piston. It has been proposed to utilize sealing rings of resilient material such as rubber or synthetic rubber-like materials and in this case the body of the piston may be of slightly smaller dimensions than the body bore, eliminating the need for close tolerance of these parts and ensuring a more reliable sealing action.

Where the sealing rings are formed of resilient material there has been some difficulty in ensuring satisfactory operation since said rings are liable to be adversely affected when passing over normal ports even if the port area is provided by a number of small holes, and one important object of the invention is to provide a construction whereby any objectionable effects which may occur as the sealing ring or rings pass over the port are reduced or eliminated and any danger of deterioration or damage with continued use in avoided.

A further object of the present invention is to provide a construction of valve which can be made by relatively simple manufacturing operations to a high degree of accuracy and which by the assembly of different component parts may be built up in various forms to allow for different control operations as regards the flow of fluid between any of a plurality of connections for incoming and outgoing pipeways.

Thereby a valve structure is provided which is adapted to be assembled from identical or similar components to form a valve assembly having various control functions, each such unit preferably including several pipeways, connections or exhaust ways and at least one port surface, said port surface being controlled by means of a displaceable actuator member incorporating one or more sealing rings to provide the desired control and the flow of fluid as between the several pipeways according to the arrangement of said units and according to the arrangement of the actuator member.

Another object of the invention is to provide a form of valve comprising component elements held in axial alignment one with the other, said elements comprising at least one element having a central bore to receive an adjustable fluid controlling structure said element or elements including a plurality of fluid connections for a fluid medium or media to be controlled by the valve structure. Another object of the invention is to provide an arrangement of axially aligned assembled units each comprising at least one fluid connection leading towards a port surface opening into a central smooth bore containing a displaceable valve structure wherein some or all of said elements are rotatable independently of one another to permit the fluid connections to be brought to the most convenient position for connection to fluid pipeways supplying fluid media passing towards or leaving the valve.

A still further object of the invention is to provide a valve structure embodying portways having a substantially complete peripheral span and consequently small axial dimensions said ports being formed in or between adjacent ring-shaped elements assembled in axial alignment and having aligned bore portions for cooperating with an axial adjustable valve structure preferably incorporating resilient sealing elements.

A still further object of the invention is to provide a valve structure wherein ring-shaped components are used having smooth cylindrical bores, all said bores being axially aligned to provide a smooth cylindrical surface for cooperation with an axially adjustable valve structure and having ports formed between adjacent elements which ports are of complete peripheral form and of narrow radial dimensions, said ports opening into peripheral chambers externally thereof and either formed wholly within the ring shaped elements themselves or being formed between such elements and outer enclosing annular members mounted in sealing contact with the ring-shaped components.

By providing several such annular ports, which are preferably provided by assembled annular rings selected or arranged to provide the requisite ports, the flow of fluid between one annular port and another port or ports can be controlled in the required manner by a comparatively small movement of the piston.

A still further object is to provide an arrangement of ring shaped elements in a valve structure wherein complete narrow peripheral port-ways are formed between adjacent elements either by recessing or setting back an inner peripheral surface of each ring in relation to an outer peripheral surface by which successive rings bear one against the other or by the provision of spacer and sealing members between outer bearing zone portions between adjacent rings, such sealing members being for instance in the nature of thin washers of deformable metal such as aluminium or copper.

A still further object of the invention is to provide a construction wherein inner and outer ring structures are provided, the outer rings being so dimensioned as to provide the required peripheral gaps between adjacent inner rings, sealing of the outer rings one against the other and against the inner rings being performed by deformable sealing elements located between bearing surfaces of the aforesaid rings.

Further objects of the invention relate to the operation of an axially displaceable valve structure within a valve body comprising assembled outer ring elements with narrow peripheral ports between them for the fluid flow, wherein said valve structure is actuated either mechanically or by fluid pressure and in the case of operation by fluid pressure the latter may be caused to operate either in one direction, in which case movement in the other direction is effected by a spring, or in both directions by fluid pressure.

Preferably each ring element or component is formed by an annulus having an annular recess in one radial face thereof, in communication with an outwardly directed coupling socket whereby a pipeway can be attached to the unit providing communication between said pipeway and the annular space. The wall portion on the inner periphery of the annulus is formed so as to provide, in association with adjacent members of the assembly or with the adjacent units, an annular gap opening into the space within the ring unit and having a comparatively small axial dimension. Nevertheless despite the narrowness of said gap adequate flow area is provided owing to the peripheral span thereof which extends all around the ring unit. By assembling several such units between end members a plurality of annular flow gaps or ports for the fluid or fluids to be controlled is provided and said gaps or ports are controlled by sealing rings in an axially displaceable piston, said rings being positioned to provide the prescribed control action for the flow of the fluid between the various annular gaps or ports.

Various forms of the invention are shown by way of example on the accompanying drawings which illustrate the several features in several combinations and in which:

Figs. 1 and 2 are cross sectional views illustrating two constructional forms of valves including various features of the invention.

Fig. 3 is a part sectional plan of Fig. 2.

Figs. 4 and 5 are cross sectional views illustrating further constructional forms of valves according to the invention and also means providing respectively for differential fluid pressure operation of the valve and for direct operation.

Fig. 6 is a partial view in section illustrating a further feature of the invention and Fig. 7 is a cross sectional view illustrating a still further constructional form of the invention and also electromagnetic control of a fluid operated valve structure.

Figure 7:
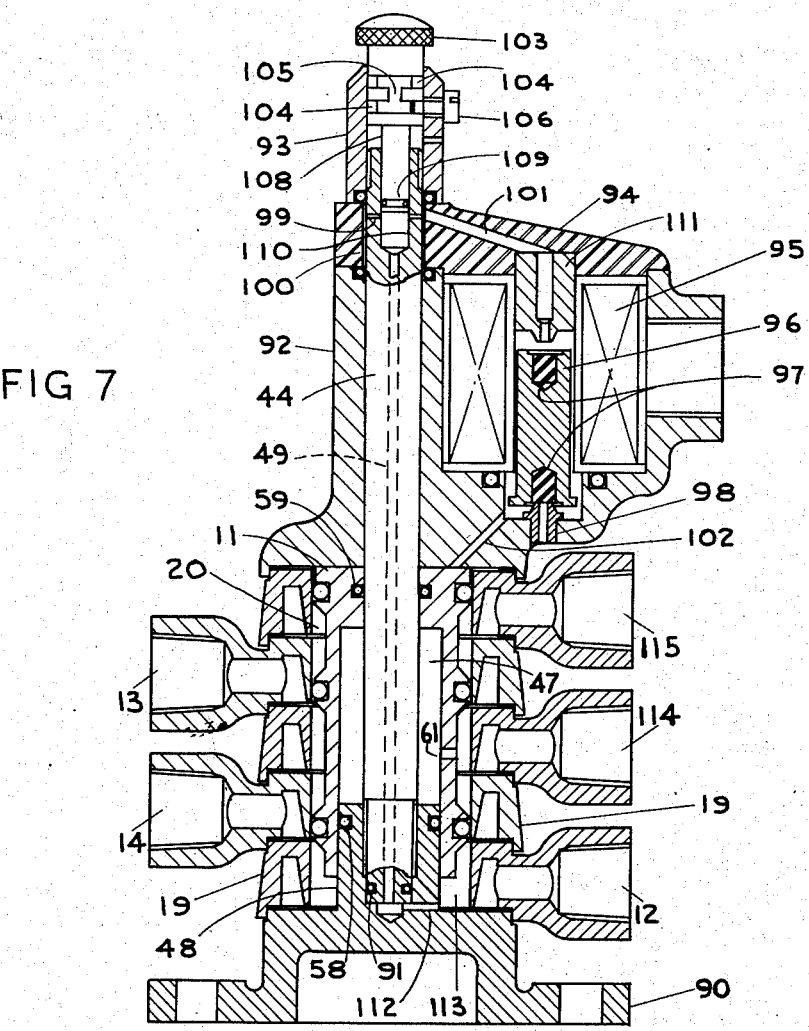

The present invention consists primarily in the provision of a valve structure wherein a movable valve member cooperates with a valve housing or body consisting of several elements located in axial alignment and preferably arranged in such a way that port gaps are formed between adjacent components. These port gaps are preferably of narrow axial dimension and of complete peripheral form, such ports opening into distribution spaces or chambers of a substantial cross sectional area by which the fluid to be controlled is distributed to the port areas. By this construction it is possible to utilize valve structures the moving element of which is provided with flexible sealing elements or the like whereby both an effective sealing action is obtained and the necessity for very high precision manufacture is avoided. The narrow axial configuration of the port ways is of importance as permitting sealing elements of the movable valve member to perform their sealing function against cylindrical wall portions of the component elements without encountering difficulty as the sealing elements pass over the port faces to perform the required controlling operations. This is of particular importance where the sealing elements consist of a ring of flexible material such as rubber or synthetic rubber.

In the form of construction shown on Fig. 1 the valve body is formed by a single central element 8 and end members 9, these parts being held in the assembled position shown by any appropriate means. The centre element 8 is recessed on both faces to accommodate the end members 9 which are of annular configuration and both the elements 8 and 9 are provided with central co-axial bores 10 lying on the same cylindrical surface and a control piston or valve element 11 is provided movable within said bores to serve as the controlling member for the fluid flow between fluid passageways formed in the centre element 8; there being for example and as shown on the drawings, a fluid inlet connection 12 and fluid delivery or return passage connections 13, 14, the flow direction being from the inlet 12 to either 13, or 14 according to the position of the valve 11 while the other passage, 14 or 13 respectively, is connected to a common fluid outlet or to the atmosphere according to the position of the valve structure 11. This provides for what is commonly denoted as a two or three position four-way valve: viz. inlet to delivery 1, delivery 2 to exhaust or inlet to delivery 2, delivery 1 to exhaust or all ports sealed.

In the form of the invention shown the inlet 12 feeds directly through a circular or other suitable port 15 into the centre of the cylindrical valve bore of the body while the passages 13 and 14 communicate with annular recesses 16 formed in the upper and lower faces of the central element 8 and opening into the end face thereof at a point adjacent the end members 9 being substantially closed thereby apart from a narrow peripheral gap g formed between the peripheral inner rim portions 17 defining the annular recesses 16 and the axially terminating faces of which are set back to a small extent from a rebate 18 against which the end members 9 are seated. By this arrangement the narrow peripheral gap g is in communication with the connection 13 or 14 respectively, the cylindrical bore surfaces on each side of said gap being formed by the bore of the centre element 8 on the one hand and the inner bore of the end members 9 on the other hand.

The control piston or valve member 11 may be of any convenient form, for example centrally recessed as indicated at 20 and being provided with peripheral enlarged portions 21 adapted to engage the bores 10 of the centre element 8 and the end members 9 so that according to the position of the valve member 11 a fluid way is formed from the inlet 12 around the reduced centre portion 20 of the valve 11 and thence (in the example shown in Fig. 1 and with the valve in the position shown) to the narrow annular gap leading to the passage 13. The passage 14, which may in fact receive return fluid from a fluid operated piston actuated by fluid from the passage 13 may then pass outwardly through the other annular gap into the space below the valve 11 and may pass either outwardly of the valve through a suitable passage or directly into the atmosphere in the case, for example, of controlling a gaseous medium. Of course when the valve 11 is reversed so that the enlarged parts 21 both lie below the adjacent annular ports the functions of the passages 13 and 14 are reversed, fluid being delivered from the inlet 12 to the passage 14 while the passage 13 receives fluid being evacuated from an operated piston. The mid-position of the valve 11 seals all ports.

This construction of valve is particularly convenient where sealing is obtained by means of annular rings 22 of rubber, synthetic rubber or the like located between flanged surfaces forming parts of the enlarged portions 21 of the valve member 11 and it will be seen that by the narrow conformation of the annular ports g the sealing rings 22 can readily traverse said ports on displacement of the valve and the danger of damage to the sealing rings is avoided, while at the same time sufficient area is provided, due to the complete annular formation of the port ways, to ensure that there is very little reduction in the total fluid flow area. In this arrangement and in those to be described where a narrow annular port is formed in a cylinder wall between adjacent component elements, the sharp corners of the ports over which the sealing surfaces of the valve pass are preferably very slightly rounded.

Figs. 2 and 3 illustrate another feature of the invention, namely the formation of a valve body by a number of separate rings 19 each associated with a single fluid flow connection 12, 13 or 14 and each of generally circular configuration so that each component element can be rotated to a position most convenient or making the desired fluid connections thereto. These figures also illustrate the assembly of a valve formed in this way by means of a centre stud, bolt or the like 29 which also serves as a mounting for an axially displaceable valve member 11, and said drawing also shows control of such a valve member in one direction by a spring 31 and in the opposite direction by fluid pressure.

In the forms of the invention now to be described with reference to Figs. 2 to 7 in each case a plurality of ring elements 19 are held in assembled relation between end caps 9, and each element may be regarded as comprising an inner sleeve or rim 17 and an outer sleeve or rim 27. The central bore 10 of each element 19 is defined by the inner wall of the inner sleeve or rim 17 and all said bores are coincident to provide a valve chamber in which the valve member 11 is slidably mounted. The elements 19 are spaced one from the other by the fact that the outer sleeves or rims 27 are in bearing engagement one with the other either directly (Figs. 2 and 5) or with the interposition of washers 40 preferably of deformable metal such as aluminum or copper (Figs. 4 and 7). In Figs. 2 to 4 and 7 the inner sleeves or rims 17 extend in the same direction as the outer sleeves or rims 27 and annular recesses 16 are thus formed between the sleeves 17 and 27 of each element 19, while in Fig. 5 the inner and outer sleeves or rims extend in opposite directions and the annular recesses 16 are formed between the inner sleeves 17 of one element 19 and the outer sleeve 27 of the next adjacent element. In Fig. 6 however the inner and outer sleeves 17 and 27 are formed by separate components, the outer sleeves 27 now forming simple ring-shaped components while the inner sleeves 17 are provided with peripheral flanges 37 clamped between successive outer sleeves 27. In all these forms of the invention the terminating face of the inner sleeve 17 may lie at a short distance from the adjacent face of an adjoining element to form a narrow annular gap $g$ providing a portway into the valve chamber formed by the aligned central bores 10 of the several elements 19, which gap opens out in each case into the annular recess 16. This spacing of the terminating face of the inner sleeve 17 from the adjacent face of an adjoining element may be determined in manufacture by setting back said terminating face or by the positioning of the adjacent face or may be determined by the thickness of the washers 40 in the case of constructions of the character shown in Fig. 4. Of course in the case of the element 19 nearest the end cap 9 the gap $g$ is formed between the terminating face of the inner sleeve 17 and a radial face of the end cap as shown in Fig. 2.

It is to be understood that the features of the invention shown in Figs. 2 to 7 do not necessarily involve the use of a valve member 11 including flexible or deformable sealing elements 22 since other forms of valves may be adopted and since the use or provision of the narrow annular gaps $g$ is primarily applicable where such flexible sealing elements are used, the invention is not to be regarded as limited to constructions wherein the parts are formed so as to provide continuous narrow gaps like $g$.

As shown in Fig. 2 each element 19 may be associated with a separate fluid connection 12, 13 or 14 and is recessed at 23 around its outer periphery on one face and on the opposite face is provided with a depending step 24 capable of cooperating with the recess of the next adjacent element to hold the parts in alignment. The bearing surfaces 25 between the adjacent elements comprise, firstly, a part of each element within the recessed portions 23 and, secondly, the part within the projecting portions 24, and these parts may readily be correctly formed so that a fluid tight joint is provided at these engaging surfaces.

The successive ring elements 19 are held in assembled position between end caps 9 formed in congruent manner to the edge surfaces of the component elements, by means of a centre fastening stud or bolt 29, which may for example bear against one cap 9 and screw into the opposed end cap 9 thereby holding the valve structure in its assembled position. Said bolt 29 also serves for slidably mounting the valve element 11 which, as in Fig. 1, may be provided with external sealing rings 22 sealing against the inner cylindrical surfaces of the component ring elements and if desired said valve is also provided with sealing rings 30 formed in the bore thereof to provide a seal against the stem portion of the bolt 29. A spring 31 around the bolt 29 and accommodated in part within a recess 32 of the valve 11 serves to lift said valve into the normal position shown in Fig. 2. One end cap 9 may be provided with a connection 33 for a supply of operating medium from a suitable pipeway so that when fluid is applied under pressure from said connection 33 the pressure acting on thee upper face of the valve 11 depresses the latter against the spring to cause reversal of the valve.

It will be realized of course that valves constructed in this way may be used for performing numerous types of control operations, that shown on the drawing providing connection from the fluidway connected to the centre element 19 to either the fluid connections to the outer elements 19 according to the position of the valve. Of course additional ring components may be provided and the valve 11 may be appropriately formed according to the control operations which it is desired to execute. Thus for example in Figs. 4, 5 and 7 a valve member 11 is shown having three spaced sealing rings 22 with two recessed portions between them.

In the arrangement shown in Figs. 2 and 3 a metal-to-metal contact is provided between the adjacent component elements 19 of the valve body and the inner sleeve or rim 17 is set back in manufacture to give a prescribed axial dimension of the port gap $g$. If desired however sealing elements may be provided between the engaging surfaces i.e. between the faces 25 in Fig. 2. This is shown for example in connection with Fig. 4 and in this case the thickness of such sealing element may determine the dimensions of the port gap $g$; in this case the end face of the inner sleeve 17 may be coincident with the adjacent bearing surface 25. Such sealing elements may be washer-like elements formed of a deformable metal such as copper or aluminium.

An alternative construction of the valve body is illustrated in Fig. 6 wherein the connections 12, 13 or 14 are associated with outer sleeve elements 27 between pairs of which the flanges 37 of inner ring elements are gripped, the latter elements including the inner sleeves 17 the centre part of which defines the bore 10 within which a valve element, such as 11, is moved. The outer sleeve elements 27 are appropriately rebated as indicated at 39 to accommodate the flanges 37 of the inner sleeve rings 17. The facing end surfaces of the outer sleeve rings 27 may be somewhat recessed beyond said rebates to accommodate sealing rings 38 proportioned so as to be deformed as the component parts 17 and 27 are tightened into the assembled position so that said sealing rings seat and provide a seal between adjacent pairs of outer sleeve rings 27 and against the peripheral outer surface of the flanges 37. Annular recesses or chambers 16 are thus formed for fluid flowing to or from the annular gap $g$ formed between the end faces of the inner sleeves 17 and the radial face of the next adjacent ring, thus providing a construction similar in operation to that shown in the other figures.

The construction of the component parts of the valve shown in Fig. 4 is substantially similar to that of Fig. 2 except that the terminating faces of the inner sleeve portions 17 are or may be coincident with the bearing surface 25 of the same component by which the latter seats against the next adjacent element and the thickness of the washer 40 determines the dimension of the peripheral annular port gap $g$. In this case however and in contradistinction to Figs. 2 and 6 wherein all the component elements face in the same direction, a centre unit 41 is shown which can be used, for example, where for one particular fluid connection, it is not necessary to provide a narrow annular port gap because for this connection a port gap need not be crossed by a sealing surface of the valve; this permits the ring units on the two sides of said centre section to face in opposite directions as will be apparent from Fig. 4. The centre unit 41 may also or alternatively be used for supporting the valve body from a flange or lug 42.

It will be seen that Fig. 4 also illustrates a form of valve wherein four port gaps $g$ are provided and wherein the valve member 11 embodies three sealing rings 22 spaced one from the other and with transfer portions 20 of reduced diameter between them. In this case no separate bottom end cap comparable with the bottom end cap 9 of Fig. 2 need be provided, the lowermost element 19 being engaged by a ring cap 45. The top end cap 9 is in this case shown as a dome-shaped member although the invention is not of course limited to this particular shape of the end cap. The valve member 11 is slidably supported on a centre stem 44 which is screwed at one end into the cap 9 and at the other end into the ring cap 45. The latter has an out-turned flange 46 seating against the lowermost element 19 such that as the cap 9 and the cap 45 are tightened onto the stem 44 on assembly, the several parts are drawn together into tight sealing contact, sealing being for example obtained by the washers 40 positioned between adjacent elements as already explained.

Fig. 4 also shows two-way differential fluid operation of the valve member 11. The latter is provided with a recessed lower portion 47 which fits in sealing manner against a sleeve extension 48 of the ring cap 45 and sealing rings 58 may be provided as shown in the outer periphery of said sleeve extension 48 to seal against the recessed bore of the valve member 11.

The stem 44 is provided with a central bore 49 having a lateral outlet 50 opening into the chamber formed by the portion of the recess 47 lying above the end of the sleeve extension 48. It will be seen that fluid admitted to an inlet connection 12 and passing through a port 61 in the valve member 11 will act upwardly on the latter by the annular surface terminating the upper portion of the chamber formed by the recess 47. If however fluid pressure is also admitted to the upper face of the valve member 11 the latter is depressed by the greater pressure exerted on the upper face compared with that exerted on the annular face terminating the chamber formed by the recess 47, it being understood that the space below the valve member 11 is open to atmosphere through one or more apertures 52 formed in the ring cap 45.

Any suitable means may be provided for controlling the admission of fluid pressure to the upper surface of the valve member 11, such means for example comprising a press knob valve 53 having a reduced stem portion, an enlarged press button head and an enlarged valving member 54 slideable within a bore in the cap 9 above the end of the stem 44, and provided with a sealing ring 55 seating against the cylindrical wall of the bore. Said bore is vented to atmosphere through a lateral passage 56 and at an intermediate point an angle passage 57 runs from a port in the cylindrical wall to the space above the valve 11. The fluid pressure in the chamber formed by the recess 47 also acts through the passages 50 and 49 against the underface of the press valve 53, thus tending to lift said valve to isolate the exhaust passage 56 and admit fluid pressure to the passage 57 so that said fluid pressure also acts on the upper face of the valve 11 to depress the latter to the lowermost position. On depression of the press valve 53, for example by thumb operation, the admission of the fluid pressure to the upper face of the valve member 11 is cut off and said space is vented to atmosphere through port 56; consequently the valve member 11 immediately rises to perform the desired fluid control operation. For example the connection 13 may lead to one end of an actuated cylinder while the connection 14 may lead to the opposite end thereof: with the valve member 11 in the position shown pressure fluid from the inlet 12 flows to the connection 13 to actuate a controlled piston in one direction, fluid leaving the opposite end of said piston being evacuated through connection 14 and reaching the atmosphere through openings 52. On reversal of the piston the inlet 12 is connected to the connection 14 and the fluid leaving the operated piston passes to the connection 13 and so outwardly through connections associated with the uppermost ring element 19. Additional sealing rings 59 and 60 are provided, respectively in grooves within the bore of valve 11 and between the base of end cap 9 and the next element 19.

In the construction shown in Fig. 5 the elements 19 include inner sleeve portions 17 extending in opposite directions to the outer sleeve portions 27 as already explained. Said drawing also shows a constructional form of valve wherein one end cap 64 is shaped on its face nearest an element 19 in such manner as to include parts, such as a portion similar to the inner sleeve portion 17, capable of completing the unit formation of the valve structure by cooperation with the next element 19 and to form the requisite gap g at this point surrounded by an annular chamber 16 communicating with a fluid connection 12.

Successive elements may be assembled in like order as will be apparent from the drawing, but the assembly may if desired be provided with an annular plain ring element 66 while the opposite end cap 67 is of essentially similar form to the end cap 64. The element 66 may include a mounting lug 42 similar to Fig. 4 as well as a fluid connection 13. In this case the annular port gap g concerned, i.e. that shown at the lowest position in the drawing, is formed between oppositely directed inner sleeve portions 17 of the lowermost ring element 19 and of the lower cap 67. Suitable sealing rings 63 are provided in association with the ring element 66, with the elements 19 and with the end caps 64, 67, said rings being conveniently arranged in suitable peripheral recesses so as to provide complete outward sealing after assembly.

In this case again the control valve member 11 is arranged in a similar manner to that shown in Fig. 4, in that the valve member 11 is slidable on a stem or stud 68 screwed at one end into a nut 69 seating against the cup 67 and the other end being provided with a head 70, a neck portion of which bears against the end cap 64 so that the elements 19 and 66 are clamped between the caps 64, 67. Sealing rings 71 are provided in peripheral recesses in the stem 68 and provide sealing in respect to a through bore in the valve member 11 sliding on the stem 68. In this case fluid pressure is admitted through the inlet 12 and communicates through a port 72 in the valve member 11 into an annular groove 73 in the stem 68 and thence passes through a radial port 74 into a bore 75 centrally within the stem 68.

The lowermost portion of Fig. 5 shows one form of pilot control for the valve member 11 and in this case a cam 76 is operated by a control knob 77 and serves to displace a pilot valve 78 movable within a chamber 79 in the stem 68. The pilot valve 78 is provided with an enlarged head portion 83 which serves to open and close a lateral port 80 in the pilot valve chamber 79 which opens into the space below the valve member 11. A pressure relief passage 82 is provided in the side wall of the valve 78 whereby when the pilot valve 78 is lifted from the position shown, for example by rotating the handle 77 to the dotted position, the space below the valve member 11 is vented to the atmosphere so that the valve may be forced in the downward direction by fluid pressure acting on the upper face thereof.

In the other form of control shown in the upper part of the figure a rotatable pilot valve disc 84 is rotatable on the collar below the head 70 of the stem 68 and said collar is provided with a peripheral groove 85 into which a lateral port forming an upper continuation of the bore 75 opens. A passage 86 in the wall of the ring 84 is adapted to make communication with a feed passage 87 opening into the space above the valve member 11. The annular sealing ring 88 may be provided in the end face of the ring 84 surrounding the port opening of passage 86 thereof to provide sealing contact between the ports of passages 86 and 87 when the pilot valve 84 is in the position shown. On rotation of said pilot valve from said position the passage 86 is brought out of communication with the passage 87 and appropriate means are provided to vent the passage 87 to atmosphere so that pressure no longer operates on the upper face of the valve 11.

By virtue of either control means shown the pressure acting on one face of the valve member 11 may be reduced to zero permitting the valve to be moved by the influence of pressure acting on the opposite face thereof. Movement in the opposite direction when the pressure is operative on both faces may be ensured either by means of a spring, or by the pressure acting around the recessed portions 20 or by the provision of differential pressure surfaces on the valve 11.

It is to be understood that in the foregoing drawings various features of the invention are described in various combinations but it should be clearly understood that the various novel features described may be utilized in various combinations by taking features shown on one drawing in association with the features shown on the other drawings. Further while the valve member 11 has been shown as incorporating resilient sealing rings 22, other forms of sealing element such as piston rings can be used, while of course it is to be understood that the number of component elements used, the arrangement of the fluid connectors and the constructional design of the valve member 11 will depend upon the controlling function to be performed by the valve.

It will also be understood that the valve 11 may be actuated manually or by a pedal control as well as by the fluid operating means described in conjunction with Figs. 2, 4 and 5.

Fig. 7 illustrates a form of the invention wherein provision is made for electromagnetic operation of the valve while certain other structural details representing modifications of the invention are also shown. The arrangement of the component ring elements is substantially the same as that shown in Fig. 4, there being in this case five assembled intermediate rings 19 which are held between a base member 90 by which the valve may be mounted on a suitable support and which is provided centrally with a sleeve extension 48 similar to that shown in Fig. 4 which enters a recess 47 in the valve member 11 which is designed for differential fluid pressure operation similar to that described in connection with Fig. 4.

The valve 11 is slidable by sealing rings 59 upon a central stem 44 screwed at its base into a blind aperture centrally of the sleeve 48, fluid sealing to the base of the blind apertures being provided by further sealing rings 91.

The stem 44 at its upper end traverses a bore in a solenoid housing member 92 and is in screwed engagement with a sleeve nut 93 serving to press against a cover meming the whole valve assembly, including the valve eleber 94 pressing against the member 92 and thereby holdments 19 in assembled position.

A solenoid winding 95 is accommodated within a chamber formed in the member 92 and is covered by a laterally extended portion of the member 94. The solenoid winding 95 embodies an armature 96 having central valve seats 97 cooperating with an exhaust bush 98 fitted to the base of the member 92 and an inlet bush 111 located in the member 94.

The stem 44 is drilled centrally as indicated at 49 which opens into a lateral bore 112 in the sleeve 48 communicating with the annular chamber 113 which receives fluid under pressure from port 12 which acts on the underside of the valve 11. Thus fluid under pressure is transmitted through the central bore 49 of stem 44 and passes outwardly through a lateral port 99 at the upper end which communicates with an enlarged bore portion 100 within the cover member 94 through which the pressure fluid is admitted through the passageway 101 into the space enclosing the armature 96. With the armature 96 in the position shown said pressure fluid is applied through a passage 102 to the upper face of the valve 11 so that the latter is depressed from the position shown by differential pressure, there being a greater surface area at the upper face of the valve 11 than at the underface represented by the upper wall of the chamber 113.

On energization of the solenoid 95 the armature 96 is lifted, opening the bore in the exhaust bush 98 so that the space above the valve 11 is open to atmosphere with the result that the pressure existing in the chamber 113 lifts the piston to the alternative position shown.

The sleeve 93 may conveniently serve to enclose a manual master control and for this purpose a slidable button 103 is provided adapted to be operated with a push and twist movement such movements being controlled by peripheral recesses 104 in the shank portion beneath the head of the buttton 103 with a transfer slot 105 between them, which cooperate with the point of a screw 106 entering the side of the sleeve and engaging in said grooves 104 and transfer slot 105. Thus by rotating the knob 103 so that the slot 105 aligns with the tip of the screw 106 the button 103 can be operated in the axial direction and after such operation it may be rotated to prevent axial movement thereof.

The button 103 is also associated with a depending stem portion 108 having a sealing ring 109 at its lower end, cooperating with an enlarged bore portion 110 in the head of the stem 44. When the button 103 is depressed the base of the stem portion 108 cuts off the supply of pressure fluid into the chamber containing the armature 96 so that access of pressure fluid to the upper face of the valve 11 is cut off and hence said valve is forced to remain in the position shown independently of the operation of the solenoid 95.

To facilitate this method of differential operation recess 47 is maintained at atmospheric or exhaust pressure by means of port 61 in the valve 11 communicating with the central fluid connection 114 which in this construction provides a common exhaust for both deliveries 13 and 14. These two deliveries are fed from independent inlet connections 12 and 115 the former in this instance also providing the pressure source for pilot operation.

What I claim is:

1. A fluid control valve comprising a plurality of axially aligned components forming a valve body, each said component having an inner bore section and an outer wall section, an axially displaceable valve member movable within a valve housing defined by the bores of the several components, resilient sealing elements on said valve member adapted to press in sealing contact with the bore sections of the said components, all said components arranged to form on assembly a narrow peripheral annular port gap between each bore section and an adjacent component such that the resilient sealing elements pass smoothly across said port gaps in either direction, means to retain said components in sealing contact and a fluid flow connection on each said component leading to each corresponding said gap.

2. A fluid control valve according to claim 1 further comprising end components closing the two ends of the valve housing, a spindle connecting said end components and means associated with said spindle to urge all the said end components and the axially aligned components into sealing contact, said spindle further supporting the valve member.

3. A fluid control valve according to claim 1 wherein each component consists of an annular element having a peripheral groove in one end face, the part of the element within said groove forming an upstanding peripheral rim terminating short of the part of the element lying externally of said groove such that the end face of an adjacent component bears against said latter part of the element and defines the narrow annular port gap, said port gaps communicating with said grooves and all said grooves being connected to fluid flow connections.

4. A fluid control valve comprising a plurality of axially aligned ring-shaped components, each component having a deep groove in one flat face thereof, the parts of the components lying externally of said groove together forming the outer wall of the valve body and the parts of the components lying within said groove forming upstanding rim portions and defining aligned bores, an end component positioned at one end of said plurality of aligned ring-shaped components, said ring shaped components and said end component forming peripheral annular port gaps between each upstanding rim and the adjacent component, a further end component at the other end of said plurality of aligned ring-shaped components screwed spindle means traversing said ring-shaped components and engaging said end components to hold all said components in assembly, a control member movable on said spindle within the aligned bores and fluid flow control means on said control member cooperating with said port gaps to control the flow of fluid through said gaps.

5. A fluid control valve according to claim 4 further comprising means to displace said control member to control the fluid flow through said ports.

6. A fluid control valve according to claim 4 further comprising manually operable means to displace said control member.

7. A fluid control valve according to claim 4 further comprising fluid pressure means to displace said control member.

8. A fluid control valve comprising a plurality of axially aligned ring-shaped elements, end elements positioned at the ends of aligned ring-shaped elements, a central spindle holding all said elements in facial sealing contact, said ring-shaped elements all incorporating a cylindrical smooth bore traversed by said spindle and together providing a cylindrical valve chamber, an axially displaceable control valve member movable within said chamber on said spindle, an inner rim portion of each ring-shaped element surrounding the bore thereof and itself surrounded by an annular recess in said element, fluid connections opening into said recesses and means whereby said inner rim is slightly spaced from the adjacent face of an adjoining element to form a narrow complete peripheral gap leading into the cylindrical bore from the annular recess, said gap forming a port over which the control valve member is swept to control the fluid through said ports.

9. A fluid control valve comprising a plurality of axially aligned ring shaped elements, end elements positioned at the ends of aligned ring-shaped elements, a central spindle to retain said elements in facial sealing contact, said ring-shaped elements all incorporating a cylindrical smooth bore and together providing a cylindrical valve chamber traversed by said spindle, a control valve member axially displaceable on said spindle within said chamber, having peripheral surfaces bearing in sealing engagement against the walls of said valve chamber, an inner rim portion of each ring-shaped element surrounding the bore thereof and itself surrounded by an annular chamber in said element, a separate fluid connection opening into each said annular chamber, the terminal face of said inner rim being set back in relation to a bearing face by which said ring-shaped element is supported against an adjacent element to form a narrow complete peripheral gap leading into the cylindrical valve chamber from the annular chamber and forming a port over which the control member is swept to control the fluid through said ports and means to actuate said valve member.

10. A fluid control valve comprising end elements, a plurality of axially aligned ring-shaped elements, a central spindle to retain said ring-shaped elements in facial sealing contact by forcing the end elements against them, a fluid connection associated with each ring-shaped element, said ring-shaped elements all incorporating a cylindrical smooth bore and together providing a cylindrical valve chamber, an axially displaceable control valve member within said chamber on said spindle and having peripheral surfaces bearing in sealing engagement against the walls of said valve chamber, an inner rim portion on each ring-shaped element surrounding the bore thereof and itself surrounded by an annular chamber in said element, a separate fluid connection opening into the bore of each ring-shaped element, a washer interposed between contiguous bearing faces of adjacent ring-shaped elements to space the terminal face of said rim from an end face of a contiguous element to form a narrow complete peripheral gap leading into the cylindrical valve chamber from the annular chamber and forming a port over which the control valve member is swept to control the fluid flow through said ports and means to actuate said control valve member.

11. A fluid control valve comprising a plurality of separate ring-shaped elements, a central spindle serving to press said elements into engaging facial contact, each element having a cylindrical bore which all form a single cylindrical valve chamber, said elements selected to form a narrow annular gap between an adjacent pair of adjacent elements, fluid connector means associated with one of said elements and in communication with said annular gaps, a control valve movable on said spindle within said valve chamber and means on said valve to seat in sealing manner against the cylindrical bores of said elements and to pass smoothly over said gaps to control the flow of fluid through said annular gaps.

12. A fluid control valve comprising end elements, a plurality of intermediate elements positioned therebetween, all said elements being assembled in facial contact and capable of independent rotary adjustment and each having a cylindrical bore, all said bores forming a single cylindrical valve chamber and each said intermediate element being provided with a fluid connector means, mating engagement surfaces on all said elements, an internal rim on each intermediate element being surrounded by an annular recess in communication with the fluid connector means and surrounding a cylindrical bore section, the terminal face of said rim being selected in relation to the adjoining face of an adjacent element to provide a narrow gap therefrom in communication with said annular recess, a control valve movable within said valve chamber and central means to clamp all said elements into facial sealing contact.

13. A fluid control valve according to claim 12 wherein said last named means comprises a threaded bolt also serving to guide the control valve.

14. A fluid control valve according to claim 12 wherein the elements are provided with mating lips and rebates to locate them laterally one in relation to the other, bearing faces between said elements being disposed in the annular zones of said elements immediately within said lips and rebates.

15. A fluid control valve comprising a plurality of separate ring shaped elements assembled in facial contact, each having a cylindrical bore which all form a single cylindrical valve chamber, spacer washers positioned between bearing faces of adjacent elements to form a narrow annular gap in the bore between adjacent pairs of adjacent elements, fluid connector means associated with one of said elements in communication with said annular gap, a control valve movable within said valve chamber, flexible sealing rings on said valve to seat in sealing manner against the cylindrical bores of said elements and to control the flow of fluid through said annular gap, and central means to clamp said elements one against the other.

16. A fluid control valve according to claim 15 wherein the elements are positioned between end members, each element further comprising an inner rim surrounding the bore and itself surrounded by an annular recess, one bearing face between adjacent elements being located on a radial face surrounding said recess and the other bearing face being formed by the opposite radial face of an adjoining element.

17. A fluid control valve comprising a plurality of successive ring-shaped elements each such element having an integral internal sleeve portion and an integral external sleeve portion, contact between adjacent elements being effected at said external sleeve portions and each said element having a radial face portion positioned adjacent to but spaced from the terminal face of the inner sleeve portion of an adjoining element to provide an annular gap opening into a cylindrical bore formed by the portions of all said elements lying within said internal sleeve, fluid connector means associated with all said elements, a central spindle to hold said elements in assembled relation, and a valve within said cylindrical bore and movable on said spindle, said valve having sealing surface portions in contact with said cylindrical bore to control the flow of fluid through said annular gaps.

18. A fluid control valve according to claim 17 wherein said internal and external sleeve portions face in the same direction and extend from a radial portion of each element to form an annular recess therebetween.

19. A fluid control valve comprising a plurality of assembled component elements, said elements including end elements and intermediate elements all rotatable one in relation to the other to different positions of adjustment, a central stem connecting the end elements and clamping together all the component elements, said stem traversing a cylindrical bore formed by bore portions of all said intermediate elements said intermediate elements being arranged to provide port gaps between adjacent elements opening into said cylindrical bore and communicating with pipe connections associated respectively with said intermediate elements, a valve member slidably mounted on said central stem, sealing elements on said valve member in bearing engagement with said cylindrical bore and adapted to traverse the port gaps between adjacent elements and means for displacing said valve member.

20. A fluid control valve according to claim 19 wherein said valve member is operable in one direction by a spring surrounding the central stem and is operable in the opposite direction by fluid pressure admitted through connection means associated with one end cap.

21. A fluid control valve comprising a plurality of axially aligned components forming a valve body including fluid inlets and outlets, each said component having an inner bore section and an outer wall section, an axially displaceable valve member movable within a valve housing defined by the bores of the several components, resilient sealing elements on said valve member adapted to press in sealing contact with the bore sections of the said components, all said components arranged to form on assembly a narrow peripheral annular port gap between the bore sections of adjacent components such that the resilient sealing elements pass smoothly across said port gaps in either direction to control passage of fluid between said fluid inlets and outlets through said gaps and means to retain said components in sealing contact.

22. A fluid control valve comprising a plurality of axially aligned components forming a valve body, each said component having an inner bore section and an outer wall section, an axially displaceable valve member movable within a valve housing defined by the bores of the several components, resilient sealing elements on said valve member adapted to press in sealing contact with the bore sections of the said components, all said components arranged to form on assembly a narrow peripheral annular port gap between each bore section and an adjacent component such that the resilient sealing elements pass smoothly across said port gaps in either direction, a plurality of fluid flow connections on said components leading respectively to different port gaps and means to retain said components in sealing contact.

References Cited in the file of this patent

UNITED STATES PATENTS

| | | |
|---|---|---|
| 323,404 | Durfee | Aug. 4, 1885 |
| 423,105 | Allen | Mar. 11, 1890 |
| 2,532,614 | Evans | Dec. 5, 1950 |
| 2,638,122 | Ludwig | May 12, 1953 |
| 2,658,523 | Johnson | Nov. 10, 1953 |
| 2,675,830 | Vuillemin | Apr. 20, 1954 |
| 2,741,264 | Leonard | Apr. 10, 1956 |
| 2,747,611 | Hewitt | May 29, 1956 |

FOREIGN PATENTS

| | | |
|---|---|---|
| 10,173 | Great Britain | of 1893 |
| 16,004 | Great Britain | of 1891 |
| 196,991 | Great Britain | Apr. 30, 1923 |